United States Patent [19]

Sawada

[11] 3,765,811
[45] Oct. 16, 1973

[54] APPARATUS FOR MANUFACTURING STANDARD-LENGTH ARTICLES COVERED WITH PLASTIC MATERIAL

[75] Inventor: Takehiko Sawada, Kawasaki, Japan

[73] Assignees: Ikegai Tekko Kabushiki Kaisha; Dai Nippon Ink Kagaku Kogyo Kabushiki Kaisha, both of Tokyo, Japan

[22] Filed: Jan. 3, 1972

[21] Appl. No.: 214,929

[30] Foreign Application Priority Data
Jan. 18, 1971  Japan............................ 46/1155

[52] U.S. Cl................... 425/113, 264/172, 425/142
[51] Int. Cl.............................................. B29d 3/00
[58] Field of Search................... 425/113, 132, 142; 264/172

[56] References Cited
UNITED STATES PATENTS

| | | | |
|---|---|---|---|
| 1,649,892 | 11/1927 | Daniels........................... | 425/113 X |
| 2,249,085 | 7/1941 | Lange............................. | 425/113 X |
| 3,557,403 | 1/1971 | Lemelson....................... | 425/142 X |

Primary Examiner—H. A. Kilby, Jr.
Attorney—E. F. Wenderoth et al.

[57]  ABSTRACT

An apparatus for manufacturing standard-short-length articles covered with a plastic material comprises means for automatically and successively supplying standard-short-length cores one by one therefrom, means for receiving said cores and moving them in longitudinally aligned relationships into a cross head die of an extruder where said cores are continuously covered with the plastic material and are made in the form of a long continuum, a take-off equipment for drawing said continuum at a predetermined speed, and means for cutting said continuum, after passed through said take-off equipment, at portions between adjacent ends of the successive cores. In order to enable the continuum to be cut in the desired portions, the core moving means and the cutting means as well as the take-off equipment are adapted to operate at the same speed.

7 Claims, 7 Drawing Figures

PATENTED OCT 16 1973  3,765,811

3,765,811

APPARATUS FOR MANUFACTURING STANDARD-LENGTH ARTICLES COVERED WITH PLASTIC MATERIAL

BACKGROUND OF THE INVENTION

This invention relates to an apparatus for the manufacture of standard-short-length individual articles covered with a plastic material.

Some cores such, for example, as a pencil lead can not be made so very long due to their physical property and/or a difficulty of their manufacture. Therefore, in order to cover such short cores with a plastic material automatically and successively, it is necessary that the cores are preliminarily cut down to the same length and are fed to a core covering equipment thereby to be covered with the plastic material. Furthermore, it is also necessary to cut the product, which consists of a train of longitudinally aligned cores and a plastic wall extruded therearound, just at portions between the adjacent ends of the successive cores. In case where the plastic material employed is relatively transparent and/or soft, the operator can readily see the portions to be cut and he can cut the product properly by his manual operation. On the contrary, in case where the plastic material is opaque and/or hard, it is very difficult or virtually impossible to see outwardly the portions to be cut of the product.

Some core covering equipment are known per se, such as an electric wire covering equipment and a steel pipe covering equipment. In the case of the electric wire covering equipment, there is apparently no problem in cutting the plastic covered wire because of employment of a long wire as a core material. Additionally, in the case of the steel pipe covering equipment, it has been practised to cut the plastic covered steel pipe by operators manual operation because not only the number of cuts is considerably few, but also the thickness of the plastic wall extruded around the steel pipe is thin sufficient to provide the plastic wall at each of the portions between the adjacent pipe ends with a deformation which can be readily viewed outwardly. Therefore, in the prior art practice, it is difficult to manufacture the standard-short-length articles automatically with a high operation efficiency and a low manufacturing cost.

What is therefore needed is to provide an apparatus capable of automatically covering standard-short-length cores of a heat resisting material, such as a metal wire, a pipe, an object of any special cross section other than circle, a pencil lead, etc., with a thermo-plastic material.

SUMMARY OF THE INVENTION

The present invention meets this need with an apparatus for manufacturing standard-short-length articles covered with a plastic material with an extruder, comprising means for automatically and successively supplying standard-short-length individual cores one by one therefrom around which the plastic material is to be extruded, means for receiving said cores and moving forward them at a predetermined speed and in longitudinally aligned relationships into a cross head die of the extruder where said cores are successively covered with the plastic material and are made in the form of a long continuum consisting of a train of longitudinally aligned cores and a plastic wall extruded therearound, said core moving means moving back to its initial position after a predetermined forward travel, a take-off equipment drawing said continuum in a forward direction substantially at the same speed as that of said core moving means in the forward direction, and means for cutting said continuum at portions between the adjacent ends of the successive cores, said cutting means movable forward and backward at the same speed as that of said core moving means.

BRIEF DESCRIPTION OF THE DRAWING

The invention is further described by way of example with reference to the accompanying drawing in which.

DESCRIPTION OF THE PREFERRED EMBODIMENT

Figure 1:
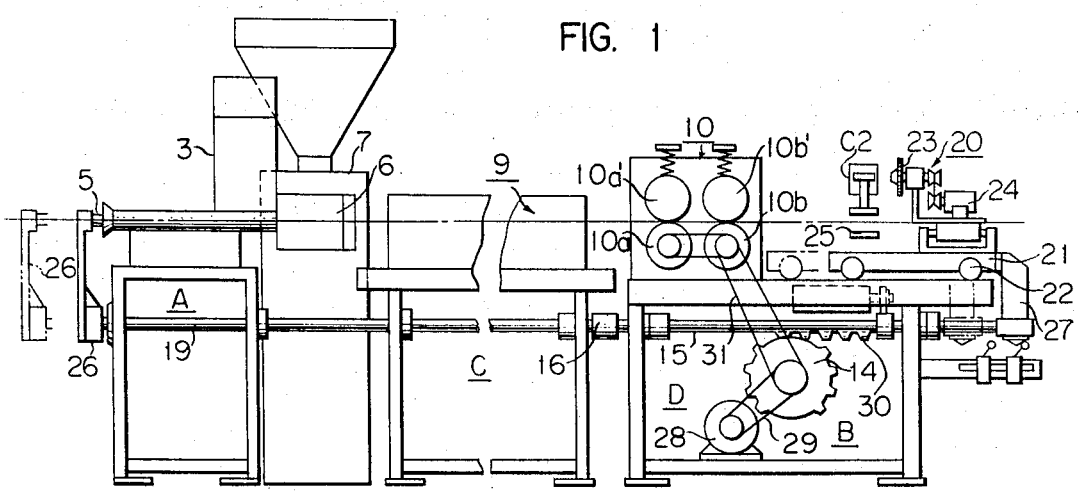
FIG. 1 is a diagrammatic, side elevational view of an apparatus, in which the present invention is incorporated, for manufacturing standard-length articles covered with a plastic material.

Referring to the drawing, particularly to FIG. 1, there is shown an apparatus for manufacturing standard-short-length articles covered with a plastic material according to this invention, comprising a core supply means in the form of a hopper 3 containing a number of short cores 2 and supplying the cores one by one from an opening 3' provided in its bottom, a horizontal guide channel 4 receiving the cores 2 from the core supply means 3, and a reciprocating push rod 5 moving forward the cores 2 along the guide channel 4 and into a cross head die 6 of an extruder 7. When passing through the cross head die 6, the cores 2 are covered with the thermoplastic material in a conventional manner and the product is made in the form of an elongate continuum. The above apparatus further comprises a take-off equipment 10 drawing the producted continuum forward, i.e., in a machine direction, after passing through a sizing plate 11 and a cooling water tank 9, and a cutting means 20 to cut the producted continuum to predetermined lengths in a manner such as described hereinafter.

Figure 3:
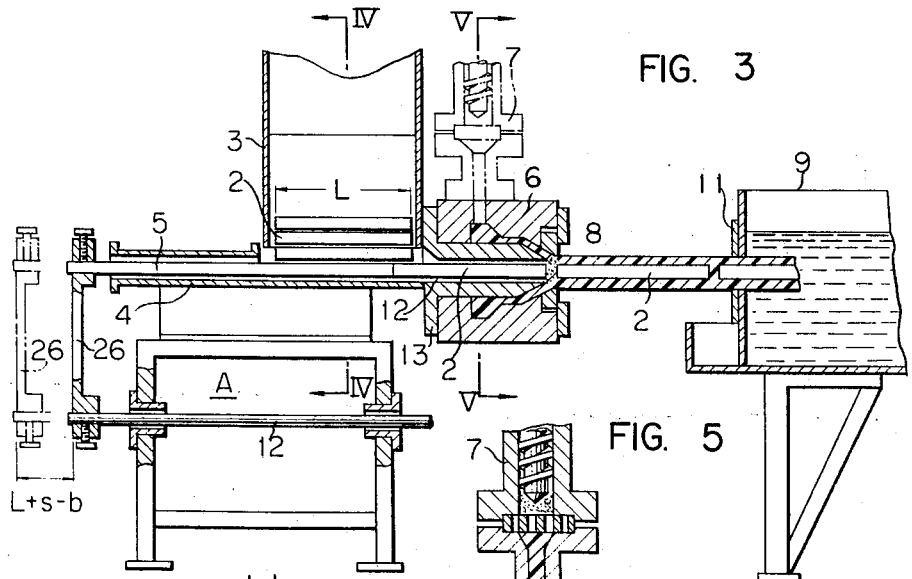
FIG. 3 is a diagrammatic elongated section of the apparatus shown in FIG. 1.
Figure 4:
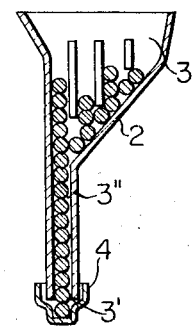
FIG. 4 is a section as viewed on the line IV — IV of FIG. 1, showing means for supplying cores.
Figure 5:
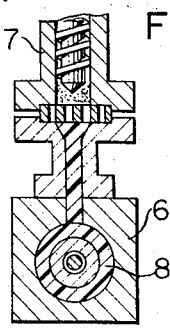
FIG. 5 is a section as viewed on the line V — V of FIG. 1, showing a connection of an extruder to a cross head die.

The hopper 3 is of a construction as shown in FIG. 4 provided with a downwardly extending elongate core path 3" through which the cores 2 are directed one by one into the guide channel 4. The core path 3" is dimensioned to have a width slightly greater than the diameter of the core 2 as shown in FIG. 4 and a length slightly greater than that of the core 2 as shown in FIG. 3 so that during travel of the cores 2 through the guide path the cores 2 can be aligned side by side with each other as shown in FIG. 4. The cores 2 to be covered are relatively short and of the same length.

The guide channel 4 has a substantially diverging U-shape in cross section and is supported substantially horizontally by a conventional structure A in a known manner. The guide channel 4 has open ends one of which, right hand end, is in alignment with a bore 12 provided in a madrel 13 of the cross head die 6, the other open end allowing the push rod 5 to enter the guide channel 4 therefrom. The push rod 5 is moved forward and backward along the guide channel 4 for a predetermined distance depending on the length of the core by a hereinafter mentioned driving system B, thereby to feed the cores 2 intermittently into the mandrel bore 12. Upon contact of the core leading end with the softened plastic material 8 present near the opening of the mandrel 13, the cores 2 become covered with the material 8 and are forced toward the cooling water tank 9 by the traction of the take-off equipment 10 and by the pressure of the plastic material 8.

These cross head die 6, extruder 7, and cooling water tank 9 are known per se and do not need to be further described. Attached to the left hand side of the cooling tank 9 is a conventional sizing plate 11 having an suitable opening for outside diameter calibration of the product. The cooling tank 9 and the take-off equipment 10 are respectively mounted on structures C and D similar to the structure A for the guide channel 4.

The take-off equipment 10 utilized by way of example is of a nip roll type and may be of any other types such as a belt type and a chain type. The take-off equipment 10 comprises a first pair of spring loaded nip rollers 10a and 10a' and second pair of spring loaded nip rollers 10b and 10b', the bottom rollers 10a and 10b being a driving member. The product passes through the successive roll nips, thereby to be taken off forward, i.e., in a machine direction, whereby the product in the form of the elongate continuum is fed to the cutting means 20.

The whole cutting means 20 is movable with the push rod 5 along the axis of the product. For the purpose, the cutting means 20 is securely disposed on a truck 21 with rotable wheels 22 which runs on the structure D toward and away from the take-off equipment 10 in a manner as hereinafter mentioned. The cutting means 20 comprises a suitable driving motor 24 for rotating a cutting blade or saw member 23. It is mentioned again that these driving motor 24 and cutting member 23 are adapted to travel along with the truck 21.

In order to ensure the product to be cut properly at the portions between the adjacent ends of the successive cores 2, there is provided, as mentioned above, the special driving system B for the push rod 5, the take-off equipment 10 and the cutting means 20 according to the invention.

The driving system B comprises a movable connecting bar or rod 19 connected at one end through an arm 26 to the push rod 5 and at the other end to a coupling 16 which is, in turn, connected to one end of a driven bar or rod 15, the other end of the rod 15 being connected through an arm 27 to the truck 21, thus allowing both the push rod 5 and the cutting means 20 to be shifted integrally on the movement of the connecting rod 19 and the driven rod 15. The driving system B further includes a drive 28 in the form of an electric motor for rotating an index gear 14 through a suitable power transmission member 29 at a speed $v$ corresponding to the taking-off speed of the take-off equipment 10. The movement of the driven rod 15 in the machine direction along the axis of the product is casued by the operative engagement of the index gear 14 with the corresponding teeth 30 formed in portions of the driven rod 15. The driving power of the motor 28 is also transmitted through a suitable power transmitting member 31 to the bottom roller 10b of the take-off equipment 10 and hence to the other bottom roller 10a. Therefore, it is understood that the movements of the push rod 5, take-off equipment 10 and cutting means 20 are completely cooperated with one another. It is necessary as hereinafter mentioned that the position of the truck 21 relative to the driven rod 15 is adjustable, so that the arm 27 is adjustably screw thread fitted to the end of the driven rod 15. In the preferred embodiment of the invention, although the required forward movements of the push rod 5 and cutting means 20 are effected by an index gear and rack assembly, it is apparent to those skilled in the art that they may be driven integrally by a suitable mechanism other than the gear and rack assembly. The arm 27 is provided at the lower end with a dog 17 for operating limit switches LS1 and LS2 which are mounted in any suitable manner to cause fluid operated cylinders C1, C2 and C3 to be actuated.

Figure 2A:
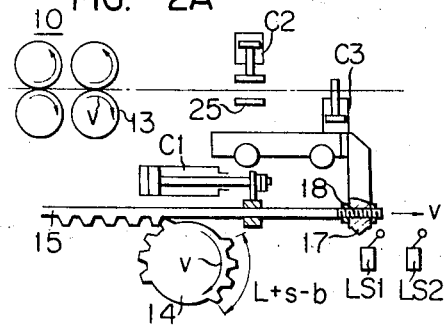
FIGS. 2A and 2B are diagrammatic views for explaining the operation of the apparatus shown in FIG. 1.

In operation, the cores 2 fall one by one into the guide channel 4 and the train of longitudinally aligned cores 2 are forced toward the cross head die 6 by the push rod 5 which is driven through the connecting rod 19, the driven rod 15 and the teeth 30 by the index gear 14. It is assumed that the length of the core is L and the spacing between the trailing end of one core and the leading end of the next core is $s$ (which is normally zero to several millimetres). In order to feed the cores 2 forward properly, the push rod 5 requires to be moved forward by a distance equal to $L + s - b$ ($b$ is a length of part of the core necessary for the reversal of the push rod 5.). At this time, the cutting means 20 is also moved by the same distance because of its integral connection with the driven rod 15. After the travel of the push rod 5 for the distance $L + s - b$ at the same speed $v$ as the taking-off speed of the take-off equipment 10, the push rod 5 stops its moving due to the disengagement of the index gear 14 from the teeth 30 as shown in FIG. 2A. The most retracted position of the push rod 5 is shown by the dotted line in FIGS. 1 and 3 and the most forward position thereof spaced the distance $L + s - b$ from the retracted position is shown in FIG. 3.

In the meantime, upon contact of the leading end of the core 2(FIG. 3) with the softened resin 8, the core 2 is drawn by the take-off equipment 10, instead of being moved by the push rod 5, and pushed out of the die 6 by the pressure of the softened resin 8 while at the same time the softened resin 8 is extruded around the core 2, thus forming the successive cores 2 into the considerably long continuum. Therefore, the product is fed through the sizing plate 11 and the cooling water tank 9 to the take-off equipment 10.

Immediately after the push rod 5 has reached the end of its forward stroke(FIG. 3), the push rod 5 along with the other integral parts is moved back to its initial most retracted position by the operation of a fluid operated cylinder C1 and alternatively by suitable mechanical means. The driven rod 15 remains at its most retracted position (FIG. 2A) until it is driven again by the index gear 14. As the stroke of the cutting member 23 equals $L + s - b$ and the product continues to move forward by the length b during the reversal of the cutting member 23, the cutting member 23 in its most retracted position coincides in position with the portion to be cut of the product existing between the adjacent core ends.

Figure 2B:
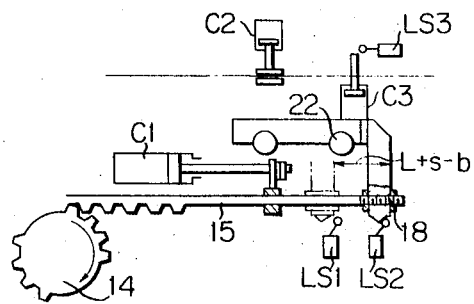

As described hereinbefore, since the truck 21 carrying the cutting means 20 thereon is connected to the driven rod 15, the cutting means 20 can move forward at the same speed $v$ as that of the product. This allows the product to be cut at the portions between any adjacent ends of the successive cores 2 in the following manner: When the forwardly moving dog 17 contacts the limit switch LS1 lying on the path of the dog 17, the product is held fixedly by a chucking means 25 to ensure the cutting operation and at the same time a fluid operated cylinder C3(FIGS. 2A and 2B) is moved in a direction perpendicular to the core taking-off direction thereby bringing the cutting member 23 into operative contant with the product. The chuck 25 is operated by the fluid cylinder C2 when it operates upon closing of the limit switch LS1 due to the engagement of the dog 17 therewith and the cylinder C3 is also made operative simultaneously with the closing of the limit switch LS1, whereby the product is firmly held by the chuck 25 and the cutting member 23 approaches the surface of the product to cut it. These chuck 25, cylinders C2 and C3 are adapted to move at the same speed as that of the cutting means 20, they do not obstruct the movement of the product.

It will be understood that the motor 24 may continue to be driven overall the successive cycles of the cutting operation or may be driven only during the limit switch LS1 is held operative. It will be further understood that the operation of the chuck 25 and the movement of the cutting member 23 toward and away from the product may be effected by any suitable mechanisms other than the fluid cylinder as described above.

Upon further forward movement of the driven rod 15 and when the latter reaches its most forward position (FIG. 2B), a limit switch LS2 is operated by the dog 17 of the driven rod 15 to cause the cylinder C2 to release the chuck 25 and the cylinder C1 to move back the driven rod 15 to its initial most retracted position(FIG. 2A). It is to be noted that the operation of the limit switch LS1 is taken place in cynchronism with the disengagement of the index gear 14 from the teeth 30 on the driven rod 15, and that the cutting member 23 is moved back to the inoperative position, prior to the re-operation of the switch LS1, by the cylinder C3 operated by a limit switch LS3.

Figure 6:
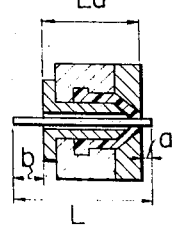
FIG. 6 is a view for explaining dimensional relationships between the cross head die and the core.

In order to completely accomplish the above mentioned operation, the following conditions are required:

1. With respect to the dimensions of the cross head die and the core to be covered(see FIG. 6), it is stated that the cross head die has to have a length $Ld$ longer than the length $L$ of the core. In FIG. 6, a letter $c$ represents a length of the core 2 projecting from the forward end of the cross head die 6, which length is necessary to allow the core covered with softened resin 8 to be taken-off by the take-off equipment, and the above mentioned letter $b$ represents a length of the core projecting backward from the backward end of the cross head die. During the travel of the core through this length $b$, the push rod has to return to its original position. Thus, the length $b$ depends on a speed of the push rod when returning. Therefore, the expression $b = L - (Ld + c)$ can be obtained.

2. With respect to a positional relationship between the push rod and the cutting blade, it is stated that a centerline of the cutting blade perpendicular to its rotational axis has to be spaced from the forward end of the push rod of FIG. 3 by a distance $(L + a) \times n$, wherein the letter $n$ represents the number of cores existing along this length.

From the foregoing, it will be understood that according to this invention an apparatus for manufacturing relatively short articles covered with a plastic material is provided wherein the feeding of the cores and the cutting of the product can be effected completely automatically with a simple construction and a reliable operation and without loss of the articles due to the miscutting. Additionally, such apparatus is most effective for the manufacture of pencils covered with a plastic material because it is very difficult to manufacture a long pencil lead.

Although a single preferred embodiment has been described above, it will be readily understood by those skilled in the art that various rearrangement of parts and modifications of parts may be accomplished without departing from the spirit and scope of the invention as described in the appended claims.

What I claim is:

1. An apparatus for manufacturing standard-short-length articles covered with a plastic material with an extruder, comprising means for automatically and successively supplying standard-short-length individual cores one by one therefrom around which the plastic material is to be extruded, means for receiving said cores and moving forward them at a predetermined speed and in longitudinally aligned relationships into a cross head die of the extruder where said cores are successively covered with the plastic material and are made in the form of a long continuum consisting of a train of longitudinally aligned cores and a plastic wall extruded therearound, said core moving means moving back to initial position after a predetermined forward travel, a take-off equipment drawing said continuum in a forward direction substantially at the same speed as that of said core moving means in the forward direction, and means for cutting said continuum at portions between the adjacent ends of the successive cores, said cutting means movable forward and backward at the same speed that of said core moving means.

2. An apparatus of claim 1, wherein said cutting means is firmly carried on a truck to assist said cutting means in its moving.

3. An apparatus of claim 2, wherein said core moving means is connected with said truck by a connecting means so that said core moving means and said cutting means are moved at the same speed.

4. An apparatus of claim 3, wherein a position of said cutting means is adjustable relative to said connecting means.

5. An apparatus of claim 3, wherein said connecting means is partially formed with teeth engageable with an index gear driven in the forward direction by a driving means for said take-off equipment, whereby said predetermined forward travel of said core moving means is caused.

6. An apparatus of claim 3, comprising an operating dog provided at a portion of said connecting means, a first limit switch disposed on a path of said dog, a second limit switch disposed at a position corresponding to the end of the forward stroke of said dog, said limit switches being operated by said dog, and a chuck means movable with said cutting means for firmly holding said continuum when said first limit switch is closed by the forward movement of said dog and releasing said continuum when said second limit switch is closed by said dog, said cutting means including a cutting member movable toward and substantially perpendicular to the axis of said continuum when said first limit switch is closed and away from the axis of said continuum when said second limit switch is closed, said connecting being moved back by a length corresponding to its forward travel when said second limit switch is closed.

7. An apparatus of claim 6, the operation of said chuck means, the movement of said cutting member toward and away from the axis of said continuum, and the reversal of said connecting means are effected by separate fluid operated cylinders cooperated with said limit switches.

* * * * *